United States Patent
Knodt

(10) Patent No.: US 8,422,053 B2
(45) Date of Patent: Apr. 16, 2013

(54) PRINT OPTIONS FOR PRODUCTIVITY

(75) Inventor: Kurt Knodt, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 1308 days.

(21) Appl. No.: 11/925,282

(22) Filed: Oct. 26, 2007

(65) Prior Publication Data

US 2009/0109464 A1  Apr. 30, 2009

(51) Int. Cl.
*G06F 3/12* (2006.01)
*G03G 21/02* (2006.01)

(52) U.S. Cl.
USPC .......................................... 358/1.15; 399/79

(58) Field of Classification Search ................. 358/1.15; 399/79
See application file for complete search history.

(56) References Cited

U.S. PATENT DOCUMENTS

| | | | |
|---|---|---|---|
| 5,564,109 A | 10/1996 | Snyder et al. | |
| 6,295,136 B1 * | 9/2001 | Ono et al. ..................... | 358/1.15 |
| 2001/0006423 A1 | 7/2001 | Subramaniam | |
| 2003/0011805 A1* | 1/2003 | Yacoub ........................ | 358/1.15 |
| 2004/0196509 A1* | 10/2004 | Cousins et al. ............... | 358/474 |
| 2007/0052992 A1 | 3/2007 | Yamada | |
| 2007/0127058 A1 | 6/2007 | Eldridge | |

FOREIGN PATENT DOCUMENTS

| | | |
|---|---|---|
| EP | 1 536 318 A1 | 6/2005 |
| JP | 2004/021455 | 1/2004 |
| JP | 2007/060267 | 3/2007 |
| JP | 2007/272762 | 10/2007 |

OTHER PUBLICATIONS

Communication received in corresponding case 08167381.6-1245 dated Feb. 12, 2009, 8 pages.

* cited by examiner

*Primary Examiner* — Twyler Haskins
*Assistant Examiner* — Fred Guillermety
(74) *Attorney, Agent, or Firm* — Hickman Palermo Truong Becker Bingham Wong LLP; Daniel D. Ledesma

(57) ABSTRACT

In an embodiment, a document processing application selects, based on an objective for a print job, one or more document processing devices and/or one or more parameter values for processing the print job. The objective may be selected by a user. Examples of objectives for a print job include fastest time to process the print job, the lowest cost to process the print job, the least amount of labor required to process the print job, the lowest cost of labor required to process the print job, and the highest quality finished product. The print job is sent to a printing device and a finishing device, one or both of which may have been selected, based on the objective, by the application. Any selected parameter values (whether selected by the application, or manually selected) are sent to the appropriate document processing device.

24 Claims, 4 Drawing Sheets

PRINT OPTIONS FOR PRODUCTIVITY

TECHNICAL FIELD

The present disclosure generally relates to document processing using printers, copiers, finishers, and other document processing devices.

BACKGROUND

Document processing devices, such as multifunction peripheral (MFP) devices, photocopiers, and laser printers can be used to create both simple documents and complex printed media applications, such as business cards, postcards, books, booklets, photographs, photo books, pamphlets, forms, catalogs, manuals, course packs, greeting cards, directories, folded brochures, letterhead, CD jewel case inserts, and other printed media applications. Proper production of such printed media applications often requires the use of separate finishing devices after printing or copying is complete. Examples of finishing devices include cutters, slicing machines, scoring machines, creasers, collaters, trimmers, punchers, binding machines, stitching machines, embossing machines, diecutting machines, shrink-packaging machines, coating machines, and multi-function finishers.

For many print jobs, a human user typically selects numerous options, such as which printing device and finishing device will process the print job, how the print media will be processed, and what parameter values to select, such as the number of copies to print, the specific pages to be printed, a particular size of media and a particular type of media. However, as the number of print options increase, it becomes increasingly difficult for a user to determine which printing device should handle a print job and which finishing device should process the printed media from the printing device, especially due to the varying characteristics (of each device) that affect the overall cost of the print job and the time it takes to process the print job.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An approach is provided for processing print jobs using print job objectives. In an embodiment, a user selects a print job objective for processing a print job. Example print job objectives include, without limitation, fastest time to process the print job, lowest cost to process the print job, and a least amount of labor to process the print job. Based on the print job objective, a print production application selects one or more print options to be used to process the print job. Non-limiting examples of "print options" include which document processing device(s) will process a print job, and parameter values (such as a specific media size). Non-limiting examples of document processing devices include printing devices, copying devices, and finishing devices. Parameter values dictate how one or more document processing devices process the print job. The print job is sent to the document processing device(s) along with one or more parameter values associated with the document processing device(s).

According to one aspect of the invention, objective selection data is received that indicates an objective for processing a print job. The one or more objectives include one or more of a fastest time to process the print job, a lowest cost to process the print job, a lowest cost of materials to process the print job, or a least amount of labor to process the print job. Based on the objective, one or more print options, from a plurality of print options, are selected. The one or more print options indicate at least one of a document processing device to process the print job or a parameter value. The document processing device is one of a plurality of document processing devices. The parameter value dictates, to one or more document processing devices, how to process the print job.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An approach is provided for processing print jobs using print job objectives. In an embodiment, a user selects a print job objective for processing a print job. Example print job objectives include, without limitation, fastest time to process the print job, lowest cost to process the print job, and a least amount of labor to process the print job. Based on the print job objective, a print production application selects one or more print options to be used to process the print job. Non-limiting examples of "print options" include which document processing device(s) will process a print job, and parameter values (such as a specific media size). Non-limiting examples of document processing devices include printing devices, copying devices, and finishing devices. Parameter values dictate how one or more document processing devices process the print job. The print job is sent to the document processing device(s) along with one or more parameter values associated with the document processing device(s).

Although the following description describes a printing device, a copying device, and a finishing device as separate devices, embodiments of the invention are not so limited. The functionally of these devices may be combined in any number of devices.

For purposes of brevity, the description refers to a finishing device "processing" a print job although, technically, a finishing device processes (e.g., cuts) one or more printed media produced by a printing or copying device.

Although the description herein refers to a single objective, multiple objectives may be selected. The multiple objectives are taken into account when selecting one or more print options, such as specific document processing devices and parameter values.

Example Production Printing System

Figure 1:
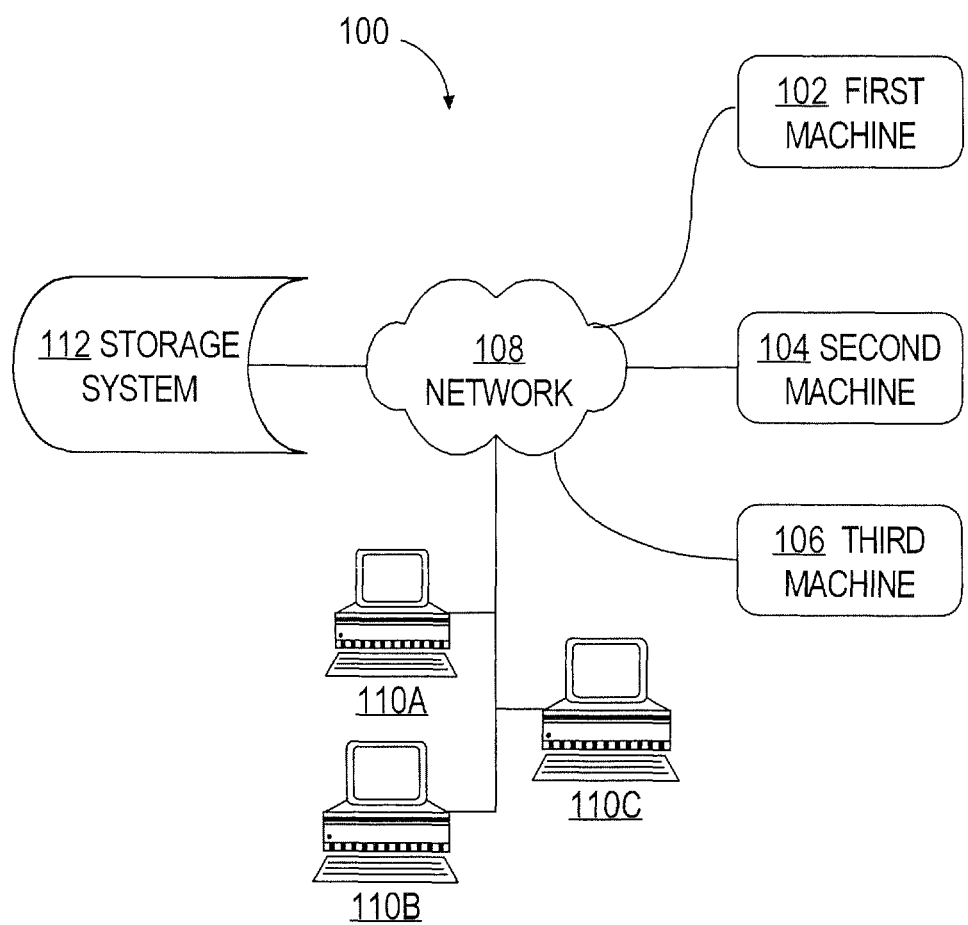
FIG. 1 depicts an example production printing system, according to an embodiment of the invention.

FIG. 1 depicts an example production printing system 100. A first machine 102, second machine 104, and third machine 106 are arranged in a printing facility. Each of the first machine 102, second machine 104, and third machine 106 may comprise any kind of document processing device. Non-limiting examples of document processing devices include printers, scanners, copiers, multifunction printers, and finishing machines such as cutters, punches, staplers, binders, drills, folders, UV coaters, etc.

In an embodiment, first machine 102, second machine 104, and third machine 106 are communicatively coupled to a network 108. One or more of computers 110A-C may be coupled to network 108. A storage system 112 may also be coupled to network 108.

Network 108 may comprise a wired network, wireless network, or combination. Network 108 may comprise any form of data link, network or networks that can communicate data among machines 102, 104, and 106, storage system 112, and computers 110A-C.

The example production printing system 100 also includes a print production application (not depicted in FIG. 1). The print production application may be implemented in hardware, software, or any combination thereof. The print production application selects, based on a print job objective, one or more print options, such as one or more document processing devices and/or one or more parameter values.

The print production application may execute on one or more of computers 110A-C, on one or more of machines 102, 104, and 106, or on another machine (not shown). Print production application may communicate with machines 102, 104, and 106 either over network 108 or directly via, e.g., a USB connection.

In some situations, there are no physical connections to machines 102, 104, and 106. In such a situation, the machines are referred to as being operated in an "offline" mode where an operator of machine 102, 104, or 106 enters setup parameters manually. In the case of "offline" devices, parameters of the print job may be provided on a separate printed sheet or on a computer screen of the offline device.

A "near-line" device is one that has a physical interface through which the machine may receive programming values and or print job data.

An "inline" device is one that is physically attached to a printing device. Media is fed directly from the printing device to an inline finishing device. For inline finishing, setup values are either sent by a printing device or provided via a control panel of the finishing device.

Functional Overview

Figure 2:
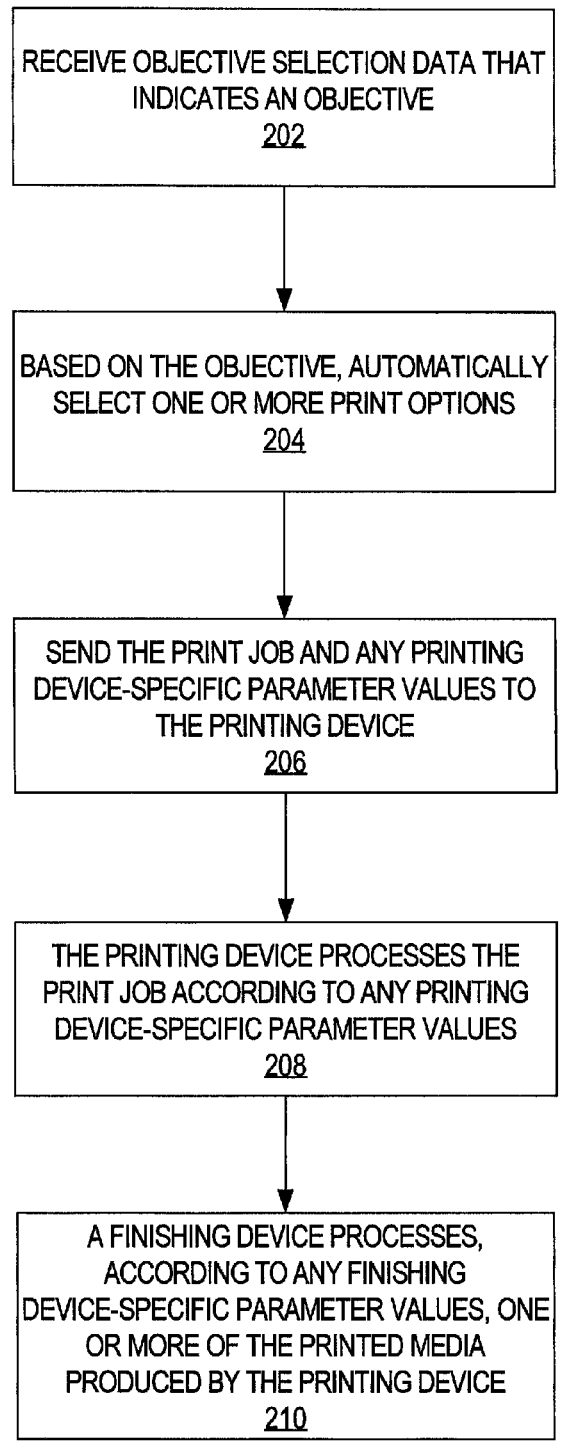
FIG. 2 depicts a process flow for selecting, based on an objective, one or more print options, according to an embodiment of the invention.

FIG. 2 depicts a process flow for selecting, based on an objective, one or more print options, according to an embodiment of the invention. At step 202, a print production application receives objective selection data (e.g., from a user) that indicates a print job objective for processing a print job. The objective selection data may be received through a user interface provided by the print production application.

At step 204, based on the objective, the print production application selects one or more print options. The selected print options may be a printing device and/or a finishing device. Additionally or alternatively, the selected print options may be one or more parameter values that dictate how a document processing device will process the print job. The selection of print options based upon an objective is described in more detail hereinafter.

A parameter is an attribute used to create a finished printed product. A finished printed product may be the printed media produced by a printing or copying device. Alternatively, a finished printed product may be printed media that results from any operations performed, by a finishing device, on the printed media produced by a printing or copying device.

Non-limiting examples of parameters include printed media application, a number of printed media applications, printing device programming (e.g., PJL, Job Description Format (JDF) data), PDLs (e.g., PDF, PostScript, PCL, TIFF, JPG), finishing device programming, manual control settings, color, bleed, media size, and media type. A value for a parameter (herein "parameter value") is usually specified by a user at the time the user initiates the processing of a print job. Values of some of the above parameters may not be specified by a user, but instead may be, e.g., transferred to the device as a result of attributes of the printed media application. One or more default values may be provided for one or more parameters, such as 18"×12" for media size.

At step 206, the print production application sends the print job to a printing device along with one or more parameter values that are specific to the printing device. The printing device may have been manually selected by a user or selected by the print production application.

At step 208, the printing device processes the print job according to one or more parameter values that are specific to the printing device. An example of a parameter that is specific to a printing device is media size. The one or more parameter values may have been manually selected by a user or selected by the print production application. As a result of this step, the printing device produces printed media.

At step 210, a finishing device processes one or more of the printed media produced by the printing device in step 208. The finishing device may process the printed media according to one or more parameter values that are specific to the finishing device. An example of a parameter that is specific to a finishing device is how the printed media is cut. The one or more parameter values may have been manually selected by a user or selected by the print production application.

Print Job Objectives

Some print jobs may be cost-sensitive, indicating that a low (or lowest) cost print job is preferable. Other print jobs may be time-sensitive, indicating that it is preferable that the print job is processed as fast as possible. Still other print jobs may be labor-sensitive, indicating that it is preferable that a print job not require much (if any) manual labor.

Therefore, according to an embodiment of the invention, a user is allowed to select an objective to be used to process a print job. A print job objective (herein "objective") is a goal, separate from the print options of a print job, for processing a print job. Non-limiting examples of objectives include a fastest time to process the print job, a lowest cost to process the print job, a least amount of manual labor (herein "labor") required to process the print job, a lowest cost of labor required to process the print job, and a highest quality finished product. Although referenced above as separate objectives, the lowest cost to process a print job might include the cost of any labor.

Unless otherwise specified, reference herein to "processing a print job" includes both the printing device and the finishing device processing the print job. Thus, for example, the fastest time to process a print job includes the total time required by a printing device and a finishing device to process the print job. The fastest time may include an estimate of how long any labor might take to process the print job.

Selecting Print Options

According to an embodiment, a print production application selects, based on an objective, one or more print options that (in combination with any other selected print options) best satisfy or achieve the objective.

Embodiments of the invention are not limited to any particular algorithm for selecting the one or more print options. In an embodiment, the print production application considers combinations of print options (e.g., that have not been selected by a user) when determining which print options to select. Each combination corresponds to a different set of print options. For example, a print production system might comprise printing devices and finishing devices, where there is a single parameter associated with the printing devices—media size. If there are three printing devices, two finishing devices, and three possible values for media size, then a print production application might consider 3×2×3=18 possible combinations.

In an embodiment, a user might select a document processing device and/or one or more of the parameter values before selecting an objective. Such selections before an objective is selected are referred to herein as "preliminary selections." In a related embodiment, one or more of any preliminary selections are default selections instead of user selections.

The print production application may take into account preliminary selections when selecting one or more print options. For example, given the above example, if the user selects a particular finishing device, then the print production application might consider 3×1×3=9 possible combinations, instead of the 18 combinations previously.

However, some preliminary selections might further constrain the number of possible combinations. For example, given the above example of three printing devices, two finishing devices, and three media sizes, the selection of a particular printing device might limit the number of possible media sizes to two. For example, the particular printing device might not support the 18"×12" media size. Thus, a preliminary selection of the particular printing device would narrow the number of possible combinations to 1×2×2=4.

Similarly, the selection of a parameter value might constrain which document processing devices are available for consideration when determining which combination best achieves the objective of the print job. For example, if a preliminary selection is 17"×11" for media size and a particular printing device does not support the 17"×11" media size, then the number of possible combinations would not include that particular printing device.

Some parameters (such as bleed) might not constrain which document processing devices are available for consideration.

In an embodiment, the print production application selects one or more print options also based on the particular type of printed media application that a user selects. The print production application determines how the printed media application may be imposed on a printed sheet. An imposition layout represents the layout according to which individual printed media applications are arranged on a printed sheet. An imposition layout includes the relevant dimensions of the print media application, the dimensions of the sheet, and the dimensions of the spaces at the borders and between the individual printed media applications on the sheet To determine an imposition layout, many attributes of a print job and device capabilities are taken into account, such as the size of the sheet, the size of the individual printed media application, the capabilities of the printing device(s) (such as printable area), and the capabilities of the finishing device(s) (such as the cutting/folding/coverage limitations or addressability limitations).

An imposition layout may vary from one type of printed media application to another based on the media size, printing device, and finishing device. For example, some automated finishing devices require specific positioning of the imposed items. Thus, after the type of printed media application and the print objective are selected, the print production application selects the document processing device(s), the imposition layout, and media size that best satisfies the print objective.

Print Job Costs

One of the objectives that a user might select is lowest cost. There may be many factors that determine the cost of processing a print job. Non-limiting examples of such factors include the type, size, and number of media upon which the print job is printed, the type of printed media application (e.g., business cards, postcards, books), any labor required to process the print job (such as operating a finishing device), the usage of one or more (e.g., leased) document processing devices (including standard maintenance costs), and consumable usage.

Labor cost is usually a function of the amount of labor required in processing a print job and, optionally, on the type of document processing device. Some devices, such as binding devices (which is a type of finishing device), require more training to operate, and thus the hourly labor rate would be greater for those devices.

In an embodiment, a user may specify and associate a cost with one or more print options, such as an hourly rate with one or more finishing devices, or a cost per page of media of a certain size.

Multiple Objectives

In an embodiment, a user may select multiple objectives for a print job. For example, a user might select both lowest cost to process a print job and the fastest time to process a print job. In selecting both lowest cost and fastest time, the user might specify a maximum cost. Only a set of combinations whose estimated cost is lower than the specified maximum cost are considered. The fastest time of each combination in that set is determined. The combination, from that set, associated with the fastest time is selected.

In a related example, the user might specify a maximum time. Only a set of combinations whose processing time is lower than the specified maximum time are considered. The lowest cost of each combination in that set is determined. The combination, from that set, associated with the lowest cost is selected.

Graphical User Interface

Figure 3:
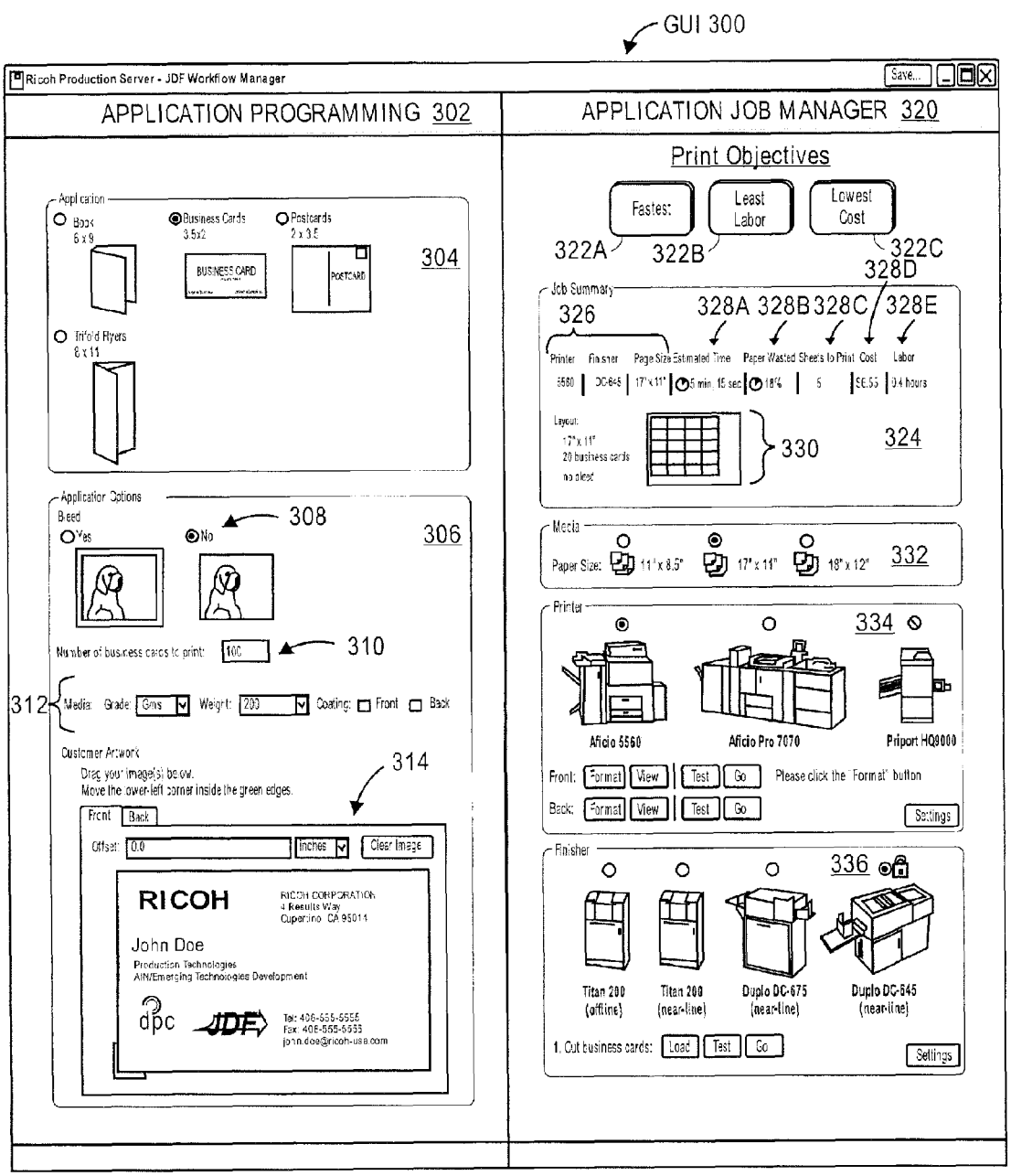
FIG. 3 depicts a graphical user interface for selecting an objective, according to an embodiment of the invention.

FIG. 3 depicts an example graphical user interface (GUI) 300 for allowing a user to select an objective and one or more print options to be used to process a print job. In an embodiment, a print production application (as described previously) generates GUI 300.

GUI 300 displays a variety of information separated into two sections: an application programming section 302 and an application job manager section 320. Application programming section 302 comprises two display regions: an application selection region 304 and an application options region 306. Application selection region 304 may comprise one or more radio buttons and image thumbnails that enable a user to select a particular printed media application. In the example of FIG. 3, possible printed media applications comprise books, business cards, postcards, and trifold flyers that can be printed with images, coated, and cut using a finisher. The approach is not limited to these example printed media applications. The printing, coating, and cutting may be performed using different machines 102, 104, 106 or all such operations may be performed using a single multifunction machine.

Application options region 306 comprises multiple interface objects to enable a user to select options that are related to the selected printed media application. In the depicted example, application options region 306 comprises a "bleed" radio button 308 that enables a user to specify whether to apply an image bleed effect to the printed business cards.

Application options region 306 also comprises a quantity text box 310 that enables a user to enter a number of printed media applications (i.e., business cards in this example) to print. Other options such as grade, weight, and coating parameters, may be selected using interface objects in sub-region 312.

Application options region 306 further comprises a sub-region 314. Sub-region 314 is where artwork to be used for a printed media application is entered. For example, a user may drag a PDF file or JPEG image into sub-region 314 and displayed in the window where further positioning of the artwork may be performed. Alternatively, a "file open" command may be offered to a user to enter a specific file name to be loaded. Selection of the "Clear Image" button in sub-region 314 removes the specific artwork. In the depicted example of FIG. 3, tabs are provided in sub-region 314 to allow artwork to be entered for both sides of the business cards that are to be printed.

Application Job Manager Section

Application job manager section 320 comprises interface objects 322A-C. Interface objects 322A-C are a set of buttons for selecting one or more objectives for a print job. Selection of object 322A is a selection for fastest time to process a print job. Selection of 322B is a selection for least amount of labor. Selection of 322C is a selection for least cost. In response to the selection of one of interface objects 322A-C, the selected print options may be displayed.

In an embodiment, there is a default objective, i.e., without requiring a user to select the objective. For example, lowest cost to process a print job may be a default objective. Thus, once the printed media application (e.g., via application selection region 304) and the number of documents (e.g., via quantity text box 310) are selected, the combination of print options is selected without the user manually selecting the objective.

Similar to application programming section 304, application job manager section 320 also comprises numerous regions: a job summary region 324, a media region 332, a printer region 334, and a finisher region 336. Job summary region 324 comprises print options 326, which displays three print options that may be automatically selected based on the selection of one or more print objectives. The selected print options are printer, finisher, and page size. In the example of FIG. 3, printer Aficio 5560, finisher Duplo DC-645, and page size 17"×11" are selected.

Job summary region also comprising different metrics 328A-E associated with a print job if the print job is processed according to the selected print options. Metric 328A displays an estimated time to process the print job. Column 328B displays an (e.g., estimated) amount of paper wasted. Column 328C displays a number of sheets required to process the print job. Column 328D displays a (e.g., estimated) cost to process the print job. Column 328E displays a (e.g., estimated) amount of labor to process the print job.

The values displayed in metrics 328A-E may be displayed after the pertinent print options are selected. For example, after selections for a particular printed media application, a number of documents, a printing device, a finishing device, and a page size, then values in columns 328A-E appear. Some of the selections, such as bleed and page size, may be default selections.

In a related embodiment, the values in metrics 328A-E may be displayed even before a user selects an objective, for example, when all the print options that are required for displaying the values in columns 328A-E are selected, either by user selection or by a default selection.

In an embodiment, multiple combinations of print options 326 and associated metrics 328A-E are displayed simultaneously. Each combination may correspond to a different row in a table where the columns of the table are print options 326 and metrics 328A-E. For example, a user may have selected lowest cost as an objective. The user is then presented with the information displayed in job summary region 324 of FIG. 3. The user may then see that another combination of print options is similar in cost and may result in a faster processing time. The user may then select that other combination.

Job summary region also comprises layout 330, which displays the imposed layout of a single printed sheet based on the printed media application, application options, selected page size, and selected document processing devices.

Media region 332 comprises a page size radio button that enables a user to specify a media size. In the example of FIG. 3, there are three possible page sizes: 11"×8.5", 17"×11", and 18"×12".

A printer selection region 334 provides a radio button and other interface objects for selecting a printing device and related options. In the example of FIG. 3, there are three possible printers: Aficio 5560, Aficio Pro 7070, and Priport HQ9000. An unavailable sign is displayed over the radio button associated with printer Priport HQ9000. The unavailable sign indicates that the corresponding print option should not be selected. If the print option is a document processing device, then an unavailable sign may indicate that the device is not capable of processing a print job, that the device is inoperative and needs to be repaired, or that the operator for that device is not available. Alternatively, a user may place the unavailable sign adjacent to a print option (e.g., using a mouse) that the user does not wish to be a selected print option.

A finisher selection region 336 provides a radio button and other interface objects for selecting a finishing device and related options. In the example of FIG. 3, there are three possible finishers: Titan 200 (that is offline), Titan 200, Duplo DC-615, and Duplo DC-645. A lock symbol is displayed adjacent to finisher Duplo DC-645. The lock symbol may indicate that the corresponding device must be used for a print job. A user may place a lock symbol adjacent to a device by, e.g., mousing over and selecting the device and then selecting a lock option.

Information used to make the objective comparisons and selections, such as labor rates, paper costs, processing speeds and times, quality levels, etc. may be obtained from many sources. Non-limiting examples of sources include information transmitted from attached device(s), information provided through one or more parameter files read by the print production application, and information provided through elements in GUI 300, such as settings boxes that are presented when the "Settings" buttons are invoked in regions 334 and 336.

Some of the selected print options may be default selections. Some of the selected print options may be user selections. At least one of the selected print options is selected by a print production application.

In response to the selection of one or more interface objects of GUI 300, a print job is sent to the selected printing or copying device along with any parameters (e.g., page size) that are specific to that device. Therefore, selecting an objective (e.g., by selecting one of buttons 322A-C) does not necessarily initiate the processing of a print job. A user might want to see which print option(s) the print production application selects before causing the print job to be sent to one or more document processing devices. For example, a user selects fastest process time as an objective to be used to process a print job. The user then determines that if the print job were processed according to the selected print options, then the cost to process the print job would be prohibitively expensive. The user may then select another objective or one or more print options that may result in a lower cost.

Implementation Mechanisms—Hardware Overview

Figure 4:
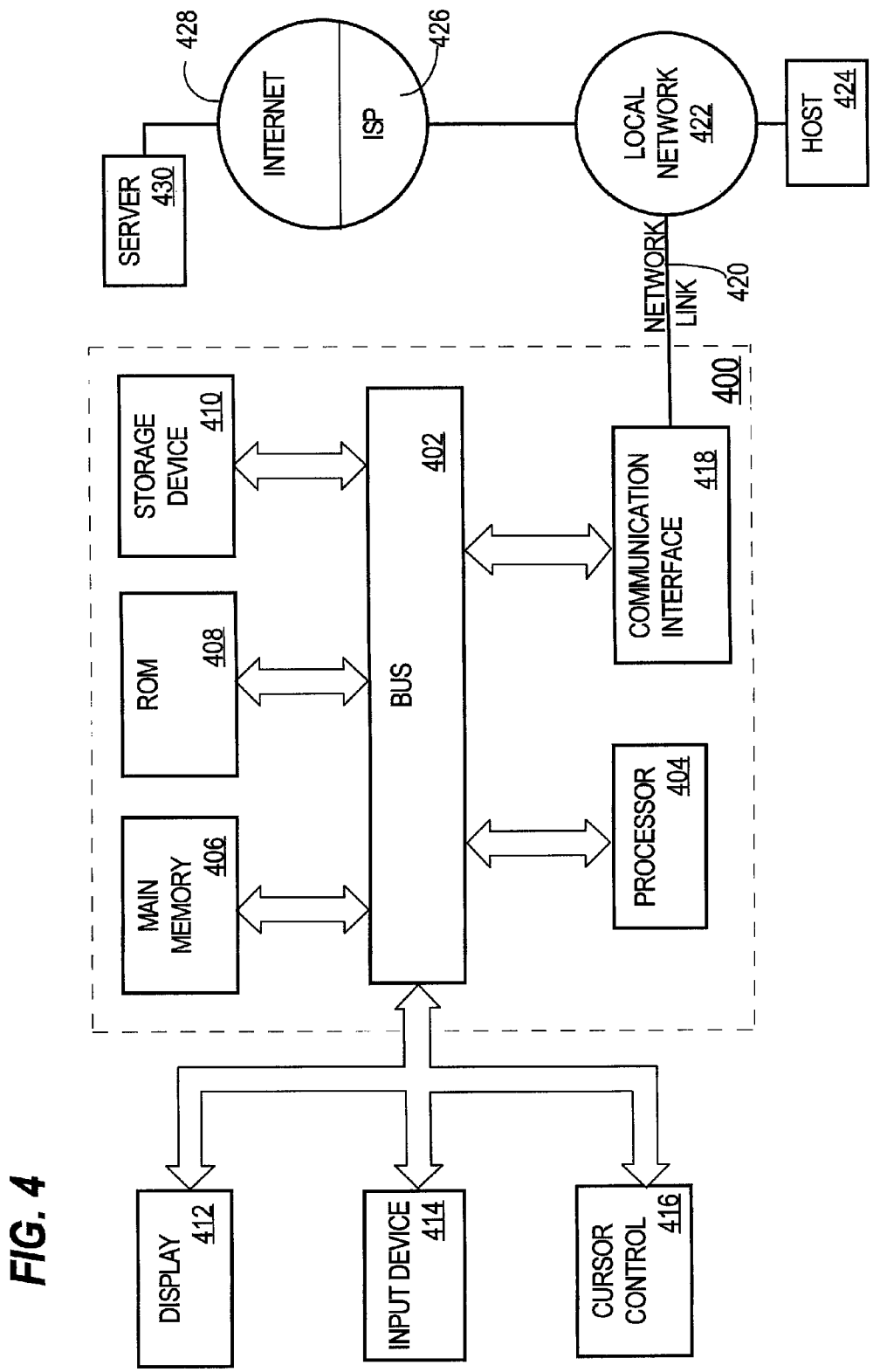
FIG. 4 depicts a computer system upon which an embodiment of the invention may be implemented.

FIG. 4 depicts a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory storage media storing instructions which, when executed by one or more processors, cause:
   receiving objective selection data that indicates one or more objectives for processing a print job, wherein the one or more objectives include one or more of a fastest time to process the print job, a lowest cost to process the print job, a lowest cost of materials to process the print job, or a least amount of labor to process the print job, wherein processing the print job includes one or more actions performed, by one or more finishing devices of a plurality of finishing devices, on printed media that one or more printing devices produce based on the print job; and
   based on the one or more objectives, automatically selecting one or more print options from a plurality of print options;
   wherein the one or more print options indicate at least one of a finishing device or a parameter value that indicates to one of the one or more finishing devices how to process the printed media;
   wherein the finishing device is one of the one or more finishing devices, each of which operates on printed media that one or more of the one or more printing devices produce.

2. The one or more storage media of claim 1, wherein the instructions, when executed by the one or more processors, further cause:
   making a determination of how a printed media application is to be imposed on one or more printed sheets;
   wherein selecting the one or more print options is at least partially based on the determination.

3. The one or more storage media of claim 1, wherein the instructions, when executed by the one or more processors, further cause:
   receiving application selection data that indicates a particular type of printed media application;
   wherein selecting the one or more print options is at least partially based on the particular type of printed media application.

4. The one or more storage media of claim 1, wherein:
   the one or more print options indicate at least a document processing device; and
   the instructions, when executed by the one or more processors, further cause sending, to the document processing device, the print job and one or more parameter values.

5. The one or more storage media of claim 1, wherein:
   the one or more print options indicate at least a parameter value; and
   the instructions, when executed by the one or more processors, further cause sending, to the finishing device, the print job and the parameter value.

6. The one or more storage media of claim 1, wherein the one or more print options indicate one or more document processing devices and one or more parameter values.

7. The one or more storage media of claim 1, wherein the objective selection data is received from a user.

8. The one or more storage media of claim 1, wherein the lowest cost to process the print job includes a manual labor cost.

9. The one or more storage media of claim 1, wherein:
   the one or more print options indicate at least the finishing device; and
   the finishing device is selected based on a manual labor rate charge for each of the plurality of finishing devices.

10. The one or more storage media of claim 1, wherein:
    the one or more print options indicate at least the parameter value; and
    the parameter value is at least one of a media size, a media type, one or more imposition parameters, one or more manual labor activities to process the print job, a print density, a cutting pattern, a type of folding, or a type of binding.

11. The one or more storage media of claim 1, wherein the instructions, when executed by the one or more processors, further cause:
    receiving, from a user, parameter selection data that indicates one or more particular parameter values for the print job;
    wherein the one or more print options indicate at least a document processing device;
    wherein selecting the one or more print options is also based on the one or more particular parameter values.

12. The one or more storage media of claim 1, wherein the instructions, when executed by the one or more processors, further cause:
    receiving, from a user, device selection data that indicates a particular document processing device that is one of a printing device or the finishing device;
    wherein the one or more print options indicate at least a document processing device that is the other of the printing device or the finishing device.

13. The one or more storage media of claim 1, wherein the instructions, when executed by the one or more processors, further cause:
  receiving cost data that indicates one or more costs associated with one or more document processing devices or one or more parameter values;
  wherein selecting the one or more print options is also based on the one or more costs.

14. The one or more storage media of claim 13, wherein the one or more costs include at least one of a manual labor rate charge, a charge per document of a particular type, a charge per page of printed media of a certain type, or a charge per page of printed media of a particular size.

15. The one or more storage media of claim 1, wherein:
  the one or more objectives include a first objective and a second objective;
  the first objective indicates a maximum cost of processing the print job;
  the second objective indicates a fastest time to process the print job; and
  a cost of processing the print job, according to the fastest time to process the print job, is less than or equal to the maximum cost.

16. The one or more storage media of claim 1, wherein the one or more print options indicate a printing device and the finishing device.

17. The one or more storage media of claim 1, wherein the one or more print options indicate a printing device, the finishing device, and a media size.

18. The one or more storage media of claim 1, wherein one or more other print options have been excluded from the plurality of print options.

19. The one or more storage media of claim 1, wherein one or more other print options have been fixed prior to selecting the one or more print options.

20. The one or more storage media of claim 1, wherein selecting the one or more print options includes selecting the one or more print options that best satisfies the one or more objectives.

21. The one or more storage media of claim 1, wherein the instructions, when executed by the one or more processors, further cause displaying, on a graphical user interface, one or more user interface objects that correspond to the one or more objectives, wherein receiving the objective selection data includes detecting user selection of one or more of the one or more user interface objects.

22. The one or more storage media of claim 21, wherein the instructions, when executed by the one or more processors, further cause displaying, on the graphical user interface, the one or more print options.

23. The one or more storage media of claim 1, wherein the print job is a first print job, wherein the one or more print options are one or more first print options, wherein the instructions, when executed by the one or more processors, further cause:
  receiving second objective selection data that indicates one or more second objectives for processing a second print job that is different than the first print job, wherein the one or more second objectives are the same as the one or more objectives associated with the first print job; and
  based on the one or more second objectives, automatically selecting one or more second print options from a second plurality of print options;
  wherein the one or more second print options are different than the one or more first print options;
  causing the second print job to be processed according to the one or more second print options.

24. An apparatus comprising:
  one or more processors;
  a non-transitory computer-readable media storing instructions which, when executed by the one or more processors, cause the one or more processors to perform:
  receiving objective selection data that indicates one or more objectives for processing a print job, wherein the one or more objectives include one or more of a fastest time to process the print job, a lowest cost to process the print job, a lowest cost of materials to process the print job, or a least amount of labor to process the print job, wherein processing the print job includes one or more actions performed, by one or more finishing devices of a plurality of finishing devices, on printed media that one or more printing devices produce based on the print job; and
  based on the one or more objectives, automatically selecting one or more print options from a plurality of print options;
  wherein the one or more print options indicate at least one of a finishing device or a parameter value, that indicates to one of the one or more finishing devices how to process the printed media;
  wherein the finishing device is one of the one or more finishing devices, each of which operates on printed media that one or more of the one or more printing devices produce.

* * * * *